United States Patent
Kandangath et al.

(10) Patent No.: US 9,644,983 B2
(45) Date of Patent: May 9, 2017

(54) SIMPLIFIED AUDIO NAVIGATION INSTRUCTIONS

(71) Applicant: Apple Inc., Cupertino, CA (US)

(72) Inventors: Anil K. Kandangath, Santa Clara, CA (US); Xiaoyuan Tu, Sunnyvale, CA (US)

(73) Assignee: Apple Inc., Cupertino, CA (US)

( * ) Notice: Subject to any disclaimer, the term of this patent is extended or adjusted under 35 U.S.C. 154(b) by 177 days.

(21) Appl. No.: 14/054,248

(22) Filed: Oct. 15, 2013

(65) Prior Publication Data

US 2015/0106012 A1    Apr. 16, 2015

(51) Int. Cl.
*G01C 21/36*    (2006.01)

(52) U.S. Cl.
CPC ..... *G01C 21/3629* (2013.01); *G01C 21/3641* (2013.01)

(58) Field of Classification Search
CPC .................. G01C 21/3629; G01C 21/3641
USPC ........................................................ 701/432
See application file for complete search history.

(56) References Cited

U.S. PATENT DOCUMENTS

| | | | |
|---|---|---|---|
| 5,528,501 A | 6/1996 | Hanson | |
| 7,395,153 B1 | 7/2008 | Nesbitt et al. | |
| 7,480,567 B2 | 1/2009 | Suomela et al. | |
| 7,512,487 B1 | 3/2009 | Golding et al. | |
| 7,917,288 B2 | 3/2011 | Cheung et al. | |
| 8,392,116 B2 | 3/2013 | Lehmann et al. | |
| 8,775,080 B2 | 7/2014 | Mizuno et al. | |
| 9,360,340 B1 | 6/2016 | Bailiang et al. | |
| 2005/0149252 A1* | 7/2005 | Brulle-Drews .... | G01C 21/3629 701/443 |
| 2006/0069500 A1* | 3/2006 | Hashizume ...... | G08G 1/096827 701/410 |
| 2009/0055088 A1* | 2/2009 | Zhang et al. ................. 701/201 | |
| 2010/0324816 A1 | 12/2010 | Highstrom | |
| 2010/0332130 A1 | 12/2010 | Shimizu et al. | |
| 2013/0158854 A1 | 6/2013 | Weir | |
| 2013/0261954 A1 | 10/2013 | Boschker | |
| 2013/0289872 A1 | 10/2013 | Segev | |
| 2014/0142849 A1 | 5/2014 | Ziezold et al. | |
| 2015/0168174 A1 | 6/2015 | Abramson et al. | |

* cited by examiner

*Primary Examiner* — Yonel Beaulieu
*Assistant Examiner* — Basil T Jos
(74) *Attorney, Agent, or Firm* — Fish & Richardson P.C.

(57) ABSTRACT

In some implementations, a mobile device can be configured to provide simplified audio navigation instructions. The simplified audio navigation instructions can provide a reduced set of audio navigation instructions so that the audio instructions are only presented to the user when the user wishes to or needs to hear the instructions. A user can enable the simplified audio navigation instructions. The simplified audio navigation instructions can be enabled automatically. The simplified audio navigation instructions can be configured with rules for when to present audio navigation instructions. For example, the rules can specify that audio navigation instructions are to be provided for complex road segments, a user defined portion of a route, or specified road types, among other criteria. The mobile device can be configured with exceptions to the rules such that audio navigation instructions can be presented when the user has, for example, deviated from a defined route.

26 Claims, 5 Drawing Sheets

SIMPLIFIED AUDIO NAVIGATION INSTRUCTIONS

TECHNICAL FIELD

The disclosure generally relates to mobile device navigation.

BACKGROUND

Mobile computing devices often include navigation features. A user can enter a starting location and a destination location in a user interface of the mobile device and the mobile device can calculate, or request from a server, a route and instructions for traversing the route from the starting location to the destination location. Often the navigation instructions can include a navigation display (e.g., map and highlighted route). The navigation instructions can include audio instructions that can tell the user which direction to go, which turn to take, etc.

SUMMARY

In some implementations, a mobile device can be configured to provide simplified audio navigation instructions. The simplified audio navigation instructions can provide a reduced set of audio navigation instructions so that the audio instructions are only presented to the user when the user wishes to or needs to hear the instructions. A user can enable the simplified audio navigation instructions. The simplified audio navigation instructions can be enabled automatically. The simplified audio navigation instructions can be configured with rules for when to present audio navigation instructions. For example, the rules can specify that audio navigation instructions are to be provided for complex road segments, a user defined portion of a route, or specified road types, among other criteria. The mobile device can be configured with exceptions to the rules such that audio navigation instructions can be presented when the user has, for example, deviated from a defined route.

Particular implementations provide at least the following advantages: A user will no longer be bothered with instructions for portions of a route that the user is familiar with. The user can be prompted to return to a route when the user deviates from the route.

Details of one or more implementations are set forth in the accompanying drawings and the description below. Other features, aspects, and potential advantages will be apparent from the description and drawings, and from the claims.

DESCRIPTION OF DRAWINGS

Like reference symbols in the various drawings indicate like elements.

DETAILED DESCRIPTION

Figure 1:
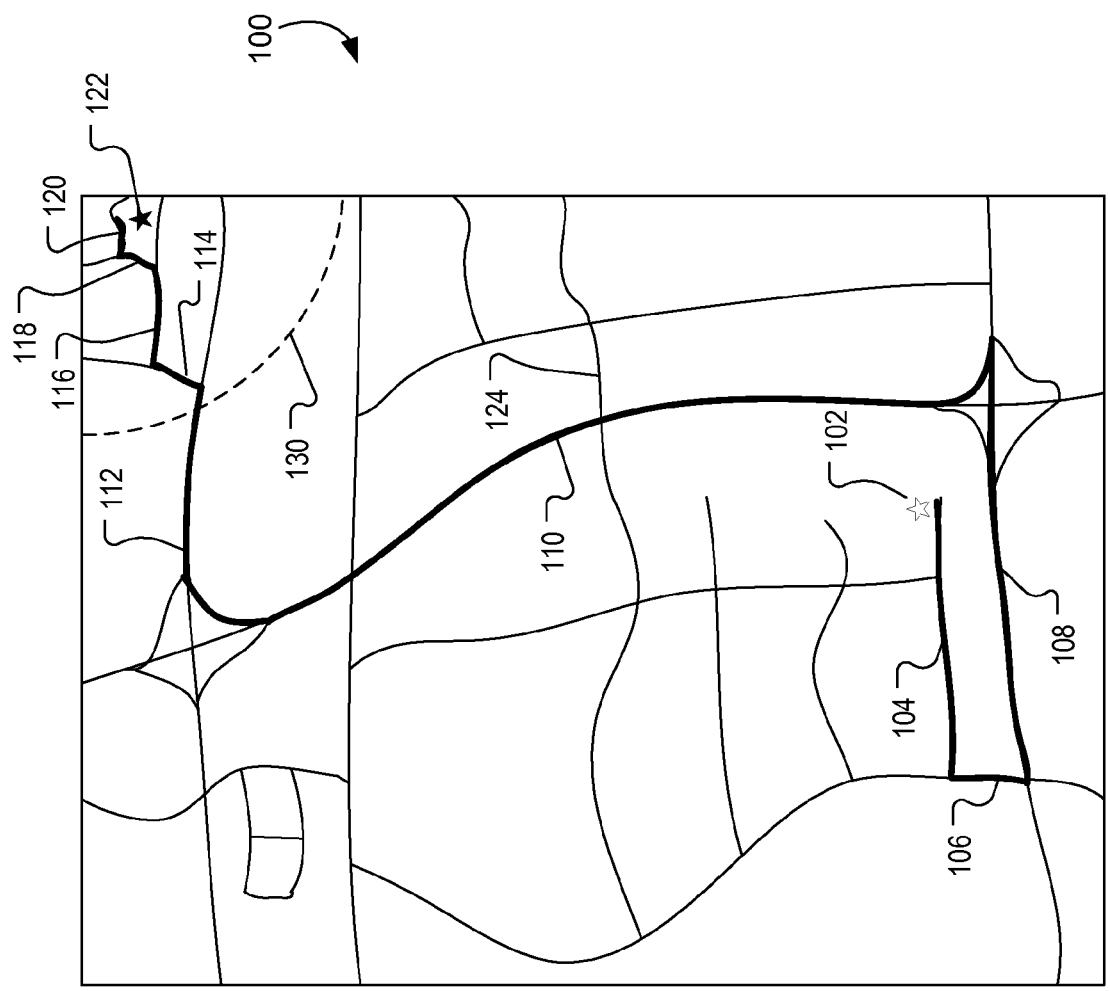
FIG. 1 illustrates a graphical user interface for presenting navigation instructions on a mobile device.

This disclosure describes various Graphical User Interfaces (GUIs) for implementing various features, processes or workflows. These GUIs can be presented on a variety of electronic devices including but not limited to laptop computers, desktop computers, computer terminals, television systems, tablet computers, e-book readers and smart phones. One or more of these electronic devices can include a touch-sensitive surface. The touch-sensitive surface can process multiple simultaneous points of input, including processing data related to the pressure, degree or position of each point of input. Such processing can facilitate gestures with multiple fingers, including pinching and swiping.

When the disclosure refers to "select" or "selecting" user interface elements in a GUI, these terms are understood to include clicking or "hovering" with a mouse or other input device over a user interface element, or touching, tapping or gesturing with one or more fingers or stylus on a user interface element. User interface elements can be virtual buttons, menus, selectors, switches, sliders, scrubbers, knobs, thumbnails, links, icons, radio buttons, checkboxes and any other mechanism for receiving input from, or providing feedback to a user.

Overview

In some implementations, a mobile device can include navigation software that can generate a route from a starting location to a destination location. For example, the starting location can be a user-specified starting location or the starting location can be automatically determined (e.g., the current location of the mobile device). The destination location can be a user-specified location, for example. Once the route is determined, the mobile device can provide navigation instructions to the user for traversing the route. For example, the navigation instructions can include graphical instructions (e.g., a map with highlighted route). The navigation instructions can include audio instructions (e.g., a voice telling the user where to go). The mobile device can monitor the user's progress along the route using common location determination technologies (e.g., using global navigation satellite system "GNSS" data, wireless network data, cellular data) and provide navigation instructions corresponding to the user's (mobile device's) current location.

Often, the user knows most of a route from a starting location to a destination location and just needs help navigating a complex portion of the route or a portion of the route that the user is unfamiliar with. Receiving audio navigation instructions for portions of the route that the user is familiar with can be annoying and can interfere with the enjoyment of other media, such as music, for example. Thus, in some implementations, the mobile device can be configured to provide simplified audio navigation instructions to the user that only present audio navigation instructions for portions of the route identified by the user or identified by the mobile device based on, for example, the complexity of portions of the route.

Thus, the mobile device will present audio navigation instructions when the location of the mobile device corresponds to a portion of the route where audio navigation instructions should be presented. Conversely, the mobile device will not present audio navigation instructions when the location of the mobile device corresponds to a portion of the route where audio navigation instructions should not be presented, as indicated by the audio navigation options described below.

FIG. 1 illustrates a graphical user interface (GUI) 100 for presenting navigation instructions on a mobile device. For example, GUI 100 can be a user interface of the mobile device mentioned above. As illustrated by FIG. 1, GUI 100 can present a map. The map can include a highlighted route that traverses road segments 104-120 from a starting location 102 to a destination location 122. In some implementations, the mobile device can be configured to present audio navigation instructions. For example, the audio navigation instructions can provide voice prompts that tell the user how to traverse a route. The voice prompts can tell the user to travel along road segment 104 and turn left onto road segment 106, for example. In some implementations, the voice prompts can provide instructions to the user for every turn and every road along the route. The voice prompts can provide instructions to continue on road segment 110 or take the exit onto road segment 112, for example. However, the user may be familiar with road segments 104-112 and may not desire audio navigation instructions for the portion of the route that includes road segments 104-112. Since the combination of road segments 114-120 is more complicated, the user may desire audio navigation instructions for these road segments. Moreover, the user may not be familiar with road segments 114-122 and may wish for audio navigation instructions to be provided for these road segments.

Enabling Simplified Audio Navigation Instructions

Figure 2:
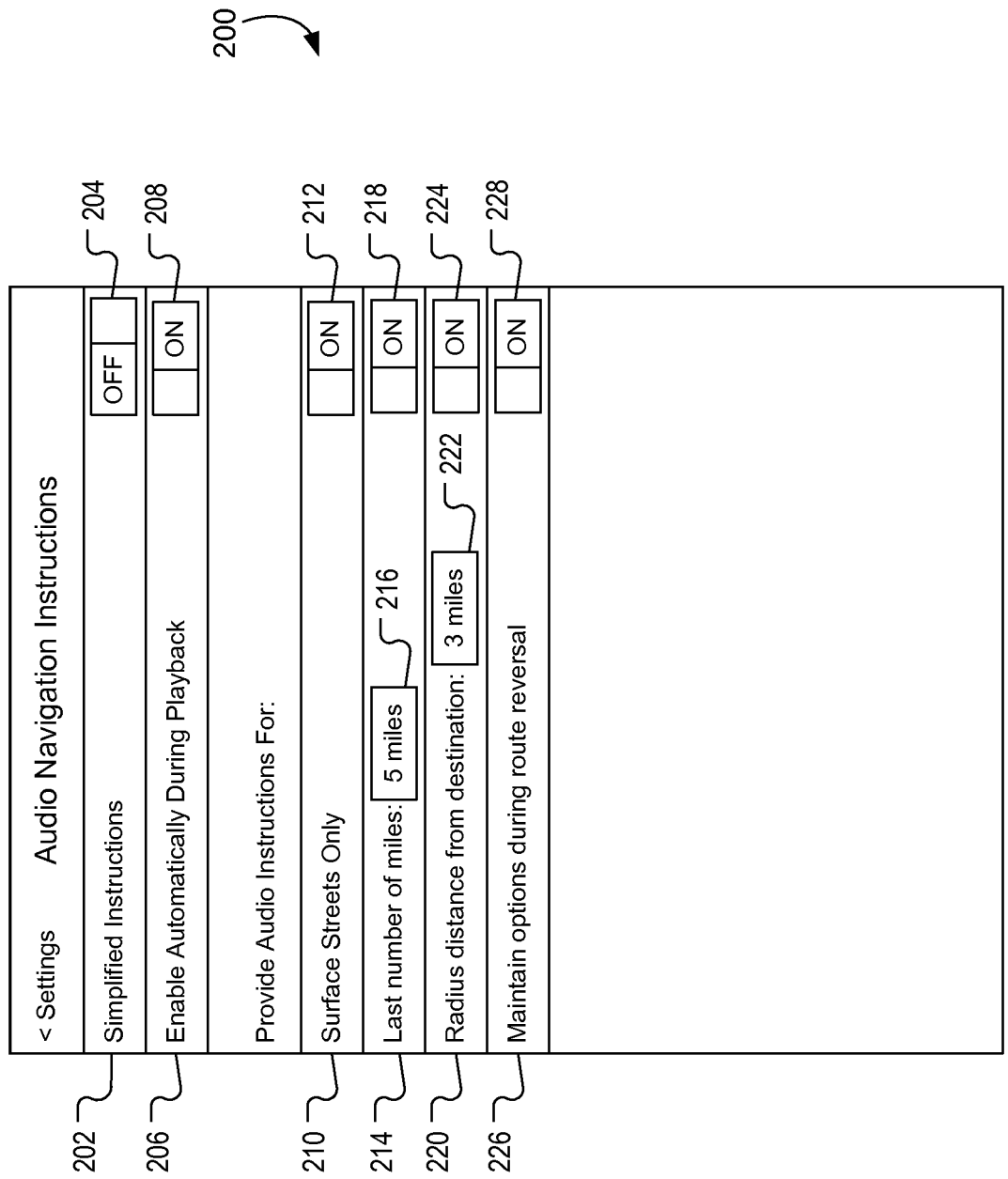
FIG. 2 illustrates a graphical user interface for configuring simplified audio navigation instructions.

FIG. 2 illustrates a graphical user interface 200 for configuring simplified audio navigation instructions. In some implementations, GUI 200 can include graphical element 202 that can present an interactive element 204 (e.g., toggle, button, etc.) for manually enabling and/or disabling simplified audio navigation instructions. A user can select interactive element 204 to enable or disable simplified audio navigation instructions, for example. When simplified audio navigation instructions are enabled, the mobile device will provide audio navigation instructions (e.g., voice prompts) for some portions of a route and not for other portions of a route. Rules or criteria for identifying portions of a route where audio navigation instructions are presented are described in detail below.

In some implementations, GUI 200 can include graphical element 206 for enabling simplified audio navigation instructions automatically when the mobile device has detected playback of media by the mobile device. For example, a user can select interactive element 208 to automatically enable simplified audio navigation instructions when the mobile device determines that the mobile device is currently playing audio media (e.g., music, video soundtrack, podcast, radio, etc.). Thus, the audio navigation instructions will only interrupt the playback of the media for important instructions that the user may need to hear.

Determining when to Present Audio Instructions

In some implementations, when simplified audio navigation instructions are enabled, audio navigation instructions will only be presented for identified or specified portions of a route. For example, when simplified audio navigation instructions are enabled, the set of audio navigation instructions normally presented to the user for navigating a route can be reduced so that only the set of audio instructions needed or desired by the user are presented to the user while the user navigates the route. In some implementations, the portions of a route where audio navigation instructions will be presented are automatically determined. For example, the mobile device can automatically determine portions of a route where audio navigation instructions will be presented by default. For example, unless the user enables one of the audio navigation options described below, the mobile device will automatically determine for which portions of a route audio navigation instructions should be presented. The user can override the default route portion selection by selecting or enabling one of the user-selectable options described below. In some implementations, audio navigation instructions can be presented for complex portions of a route in addition to the user-specified audio navigation options described below.

Determining Complexity of Route Portions

In some implementations, the mobile device can automatically determine a portion of a route where audio navigation instructions will be presented based on the complexity of the portion of the route. The complexity of a portion of the route can be determined based on, for example, the number of turns (e.g., road changes) within the portion of the route. For example, a single turn within a five mile portion of the route can be identified as a low complexity portion of the route. Five turns within a one mile portion of the route can be identified as a high complexity portion of the route. For example, complexity can be defined as a ratio of turns per mile (e.g., turns/mile). If a portion of a route is above a threshold complexity ratio (e.g., 3 turns per mile), then the portion of the route can be identified as a portion of the route where audio navigation instructions should be provided. If the portion of the route is less than the threshold complexity ratio, then the portion of the route can be identified as a portion of the route where audio navigation instructions should not be provided. As the user traverses the route, audio navigation instructions will be presented according to the complexity analysis described above.

In some implementations, route portion complexity can be determined based on historical navigation data. For example, the mobile device can maintain historical data describing navigation errors committed by the user. For example, the historical data can keep track of locations where a user misses a turn while traversing a route. If the user often misses the same turn, a route segment that includes the often missed turn can be identified as a complex portion of the route and the mobile device can present audio instructions for the often missed turn.

In some implementations, route portion complexity can be determined based on crowd sourced navigation data. For example, similar to using the individual user historical data described above to determine complexity of a route portion, historical navigation data can be collected from multiple users using multiple mobile devices. The crowd sourced historical navigation data can be analyzed for common navigation errors (e.g., a commonly missed turn). When a route includes a route portion that is associated with a common navigation error (e.g., missed turn), the route portion can be identified as a complex route portion and audio navigation instructions can be provided for the complex portion of the route.

User-Specified Audio Navigation Options

In some implementations, the portions of a route where audio navigation instructions will be presented can be specified by the user. For example, the user can provide input to GUI 200 to specify portions of a route where the mobile device should present audio navigation instructions. In some implementations, GUI 200 can present graphical element 210 including interactive element 212 (e.g., toggle, button, etc.) for enabling audio navigation instructions for surface streets only. For example, the user can select interactive element 212 to enable or disable the surface streets only option. In some implementations, when the surface streets only option is enabled, the mobile device will not present audio navigation instructions for highways, freeways, etc. When the surface streets only option is enabled, audio navigation instructions will only be presented for non-highway type roads (e.g., city streets, rural routes, country roads, etc.). For example, referring to FIG. 1, if road segment 110 is a highway (e.g., highway, freeway, etc.), then, when the user starts traversing the route, the user will receive audio navigation instructions for the road segments 104, 106 and 108. The mobile device will stop providing audio navigation instructions for road segment 110 (e.g., because road segment 110 is a highway). The mobile device will resume presenting audio navigation instructions when the user exits road segment 110 to begin traversing road segments 112, 114, 116, 118 and 120 to destination 122.

In some implementations, GUI 200 can present graphical element 214 including interactive elements 216 and 218 for enabling or disabling audio instructions for the last portion of a route. For example, the user can enable or disable audio instructions for the end portion of a route by selecting interactive element 218. The user can input a number into interactive element 216 (e.g., a text box) to indicate for how much of the end of a route audio instructions should be presented. For example, the user can indicate a number (e.g., 5) to indicate that audio navigation instructions should be presented only for the last 5 miles of a route. In some implementations, the mobile device can be configured to present audio navigation instructions for the starting portion of a route. For example, the user can interact with GUI 200 to specify a first number of miles for presenting audio navigation instructions in the same manner described above for the last number of miles of a route. The user can specify that audio navigation instructions should be presented for the first ten miles of a route, for example.

In some implementations, GUI 200 can present graphical element 220 including interactive elements 222 and 224 for enabling or disabling audio instructions within a radius distance of a destination location. For example, the user can enable or disable the radius distance option by selecting interactive element 224. The user can specify the radius distance by inputting a number into interactive element 222 (e.g., a text box). For example, the user can input the number 3 to indicate that instructions should be provided when the user enters within a three mile radius of the destination location of the route. For example, referring to FIG. 1, the radius distance can be indicated by dotted line 130. When the user navigates along the route and enters the area delineated by dotted line 130, the mobile device will begin presenting audio navigation instructions to the user.

In some implementations, the user can adjust the radius distance by interacting with GUI 100. For example, the user can provide a touch input gesture (e.g., touch and drag, two finger touch and separate fingers, pinch fingers together, etc.) to make the radius distance larger or smaller. In some implementations, the mobile device can be configured to provide instructions within a radius distance of the starting location. The user can specify the radius distance for the starting location in the same manner as described above for the destination location. For example, the user can specify that audio navigation instructions should be presented within a two mile radius of the starting location. Once the mobile device moves outside the two mile radius, the mobile device will cease presenting audio navigation instructions for the route.

In some implementations, GUI 200 can present graphical element 226 including interactive element 228 for enabling or disabling audio navigation instructions for a previously traveled route. For example, a user can select interactive element 228 to cause the simplified audio navigation instruction options for a previous route to be reversed. For example, referring to FIG. 1, when a user traverses the route from starting location 102 to destination location 122, the user can configure the mobile device to only provide navigation instructions for the last 5 miles of the route, as described above. If the starting location 102 is the user's home and destination location 122 corresponds to a restaurant, for example, the user may wish to reverse the route to go back home after dining at the restaurant. The user can specify the route (e.g., from destination location 122 to starting location 102) and the mobile device can determine that the route corresponds to the reverse of the previous route from starting location 102 to destination location 122. When the mobile device determines that the maintain options during route reversal option is enabled and that the user is reversing a previous route, the mobile device can automatically provide audio navigation instructions for the same portions of the route that audio navigation instructions were provided on the previous trip. For example, on the route from starting location 102 to destination location 122, the user may have configured the simplified navigation instructions to provide audio navigation instructions for only the last five miles of the trip. On the reverse trip, the mobile device can automatically provide audio navigation instructions for the first five miles of the trip, since on the previous trip the user indicated that the user did not need audio instructions until the last five miles. Similarly, the radius distance and/or surface street settings of the previous trip and be applied to the return trip when the maintain options during route reversal option is enabled.

Exceptions

In some implementations, the mobile device can present audio navigation instructions for portions of a route not identified by the mobile device or user. For example, if the user deviates from the route on a portion of the route where, based on the complexity of the route or user specified options, no audio navigation instructions should be presented, then based on the detected deviation, the mobile device can begin presenting audio navigation instructions to the user. For example, referring to FIG. 1, if the mobile device is configured to prevent audio navigation instructions from being presented to the user while on road segment 110 and the user deviates from the highlighted route by exiting road segment 110 (e.g., highway) onto road segment 124, then the mobile device can begin presenting audio navigation instructions to the user. The audio navigation instructions can continue until the user returns to a portion of the prescribed route where audio navigation instructions should not be presented.

Server Implementation

The description above discloses functions and features in terms of a mobile device configured to perform the functions and provide the features described. However, some of the functions and features can be performed by a server in communication with the mobile device over a network connection. For example, the route determination, historical data and crowd sourcing features can be performed by a server that determines a route, analyzes the historical data, and collects the crowd sourced information and transmits the route and navigation instructions to the mobile device for presentation to the user.

Figure 3:
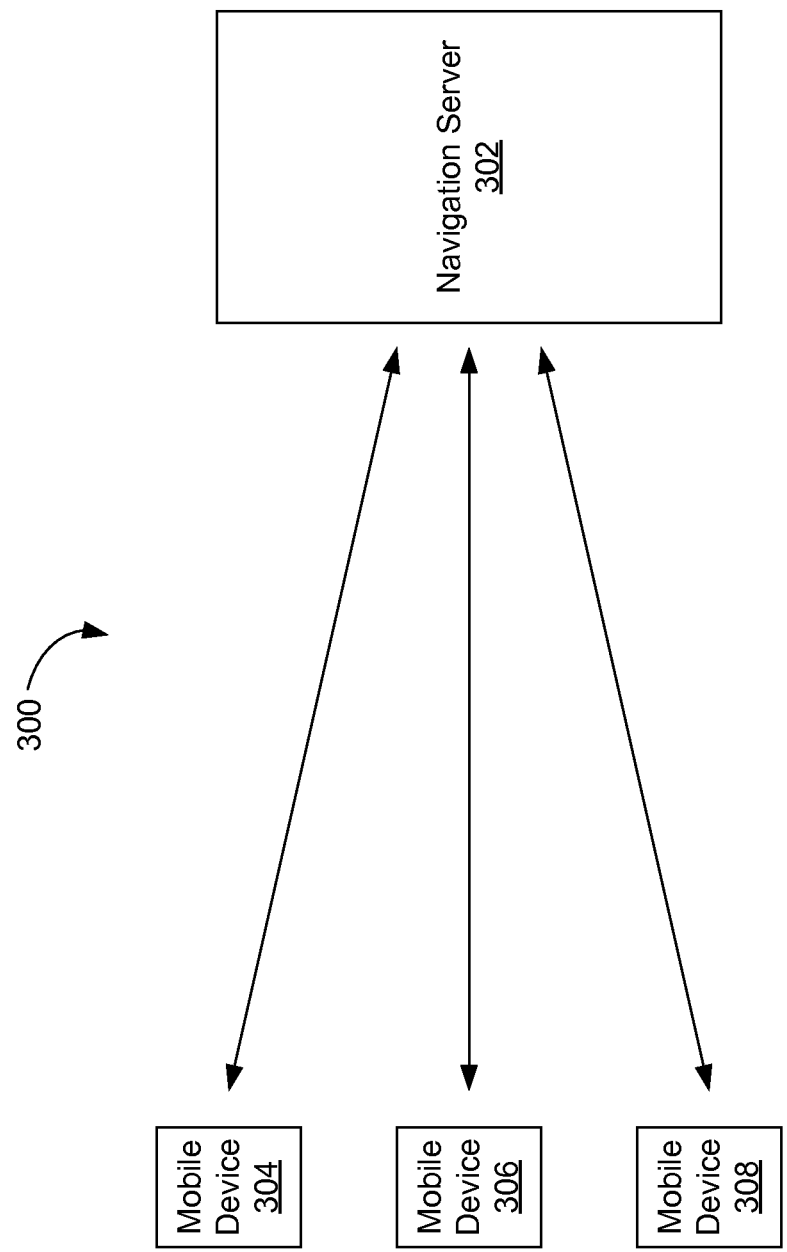
FIG. 3 is a block diagram of a system for providing simplified audio navigation instructions.

FIG. 3 is a block diagram of a system 300 for providing simplified audio navigation instructions. For example, system 300 can include server 302. Server 302 can be a navigation server configured to receive route requests from mobile devices 304, 305 and 306. For example, mobile device 304 can send a navigation request that includes a starting location, a destination location and audio navigation instruction options to server 302. The server 302 can receive the request and generate a route based on the starting location and destination location.

In some implementations, server 302 can generate audio navigation instructions for traversing the generated route. For example, when simplified audio navigation instructions are disabled on mobile device 304, then the server 302 can generate audio navigation instructions for the entire route. In some implementations, when simplified audio navigation instructions are enabled on mobile device 304, server 302 can generate audio navigation instructions for the entire route. For example, server 302 can generate audio navigation instructions for the entire route and the mobile device 304 can determine where along a route to present audio navigation instructions based on complexity or user-selected options, as described above.

In some implementations, when simplified audio navigation instructions are enabled and no user options have been specified, then the server 302 can determine portions of the route for which audio navigation instructions should be generated based on the complexity of portions of the route. For example, server 302 can determine complexity based on turns per mile, as described above. Server 302 can determine complexity based on crowd sourced historical navigation data received from mobile devices 304-306. Server 302 can analyze the historical data to determine locations where navigation areas commonly occur and if those locations are located on the generated route, the portion of the generated route that includes those locations can be identified as a complex portion of the route.

In some implementations, when simplified audio navigation instructions are enabled and one of the user specified options is enabled, then server 302 can determine portions of the route for which audio navigation instructions should be generated based on the user selected options. For example, if the user has specified that audio navigation instructions should be presented for the first (or last) five miles of a route, server 302 will generate audio navigation instructions for only the first (or last) five miles of a route. If the user has specified that audio navigation instructions should be presented within a six mile radius of the destination (or starting) location, then server 302 will generate audio navigation instructions for only the portion of the route within the six mile radius of the destination (or starting) location.

In some implementations, if the user has enabled the maintain options during route reversal option, the mobile device 304 will determine that the previous route has been reversed and send the appropriate options to the server 302. For example, the mobile device 304 can determine that the previous route is being reversed by comparing the start location (S1) and destination location (D1) from the previous route to the start location (S2) and destination location (D2) of the subsequent route. For example, if S2 is the same location as D1 and D2 is the same location as S1, then the previous route has been reversed. In some implementations, if the previous route is reversed on the subsequent route, then the simplified audio navigation options can be reversed as well. For example, if on the previous route, the mobile device 304 was configured to provide audio navigation instructions for the last three miles of the route. On the subsequent reverse route, the mobile device 304 can be automatically configured to provide audio navigation instructions for the first three miles of the reverse route. The mobile device 304 can then send the start location (S2), destination location (D2) and reverse audio navigation options to server 302 so that server 302 can generate the route and audio navigation instructions.

In some implementations, once server 302 has generated the route and audio navigation instructions, the server 302 can transmit the route (e.g., map data and route data) and audio navigation instructions to mobile device 304.

Map Display

In some implementations, the map display presented by the mobile device can present the route to be traveled by a user. For example, the mobile device can include a navigation (e.g., map and route) display as illustrated by FIG. 1. In some implementations, the navigation display can present an overview of the route on a map. For example, the overview navigation display can show the entire route and indicate a location on the route where the mobile device is currently located. In some implementations, the navigation display can show a turn-by-turn presentation of the route. For example, the turn-by-turn display can be a zoomed in presentation of the route that presents a close up view of a single turn. In some implementations, the mobile device can present the overview navigation display or the turn-by-turn navigation display based on when (or where) audio navigation instructions are presented to the user of the mobile device. For example, if the mobile device is configured to present audio navigation instructions only for the last four miles of the route, then the mobile device will present the overview navigation display for the first portion of the route where no audio navigation instructions are presented and present the turn-by-turn (e.g., zoomed in) navigation display for the last four miles of the route.

Example Process

Figure 4:
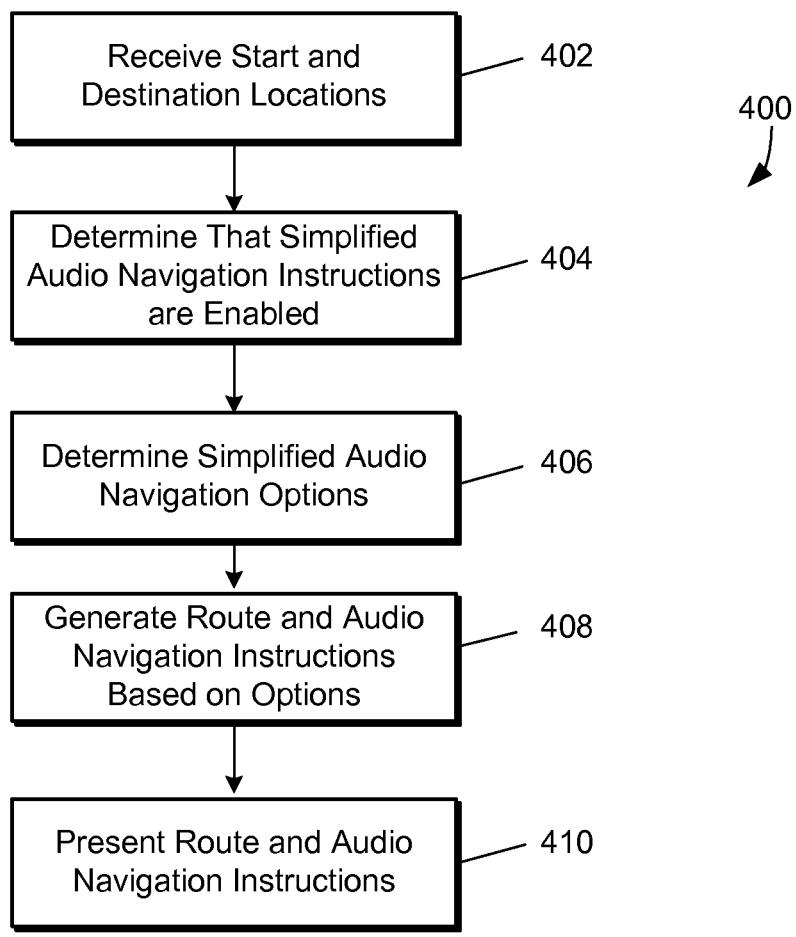
FIG. 4 is flow diagram of an example process for presenting simplified audio navigation instructions.

FIG. 4 is flow diagram of an example process 400 for presenting simplified audio navigation instructions. For example, process 400 can present a reduced set of audio navigation instructions to a user so that the user will receive audio navigation instructions when the user needs the instructions without imposing the audio navigation instructions upon the user when the user does not need or want the audio navigation instructions.

At step 402, the mobile device can receive start and destination locations. For example, the user can specify the start location by specifying a location (e.g., an address) or indicating to the mobile device that the current location of the mobile device should be used as the starting location. The user can specify the destination location by inputting an address or selecting an address (e.g., from an address book, webpage, etc.).

At step 404, the mobile device can determine that simplified audio navigation instructions are enabled. For example, the mobile device can determine that the user has selected to enable simplified audio navigation instructions on an audio navigation settings interface of the mobile device. The mobile device can determine that simplified audio navigation should be automatically enabled when the mobile device determines that a media application on the mobile device is currently playing audio media (e.g., music), as described above with reference to FIG. 2.

At step 406, the mobile device can determine which simplified audio navigation options are enabled. For example, the mobile device can determine that the default route complexity based audio navigation instructions should be presented to the user if no other user-selectable options have been enabled or selected. The mobile device can determine that radius based, route distance based (e.g., first/last n miles), street type based audio navigation instructions should be presented. The mobile device can determine if the maintain options during route reversal option has been selected.

At step 408, the mobile device can generate route and audio navigation instructions based on the enabled simplified audio navigation options. For example, the mobile device can transmit start location, destination location and audio navigation options to a server and the server can generate a route and navigation instructions based on the start location, destination location and audio navigation options. In some implementations, the audio navigation instructions can be determined based on a previously traversed route when the maintain options during route reversal option is selected. For example, the server can generate audio navigation instructions for complex portions of the route, portions of the route that are within the user-defined radius of the start or destination location, portions of the route that are the first or last n (e.g., 5, 7, 11 miles, etc.) of the route, or portions of the route that are comprised of non-highway roads. In some implementations, the mobile device can include map data such that the mobile device can compute the desired route and generate the audio navigation instructions according to the default or user-selected options.

At step 410, the mobile device can present the generated route and the audio navigation instructions according to the audio navigation options. For example, the mobile device can receive the map data, route data and audio navigation instructions from the server and present the map, route and audio navigation instructions to the user. The audio navigation instructions can be presented for only the portions of the route indicated by the user (e.g., first/last portion, radius, street type selection) or determined by the mobile device (or server) to be complex portions of the route.

In some implementations, the mobile device can present the graphical map and route data in an overview map display when audio navigation instructions are not presented for a portion of the route. In some implementations, the mobile device can present the graphical map and route data in a turn-by-turn map display when audio navigation instructions are presented for a portion of the route.

In some implementations, audio navigation instructions can be presented when the user deviates from a prescribed route. Once the user returns to a portion of the prescribed route where audio navigation instructions are not to be presented, the mobile device will cease presenting audio navigation instructions until the mobile device enters a portion of the route where audio navigation instructions are desired by the user, as indicated by the default or selected audio navigation options.

Example System Architecture

Figure 5:
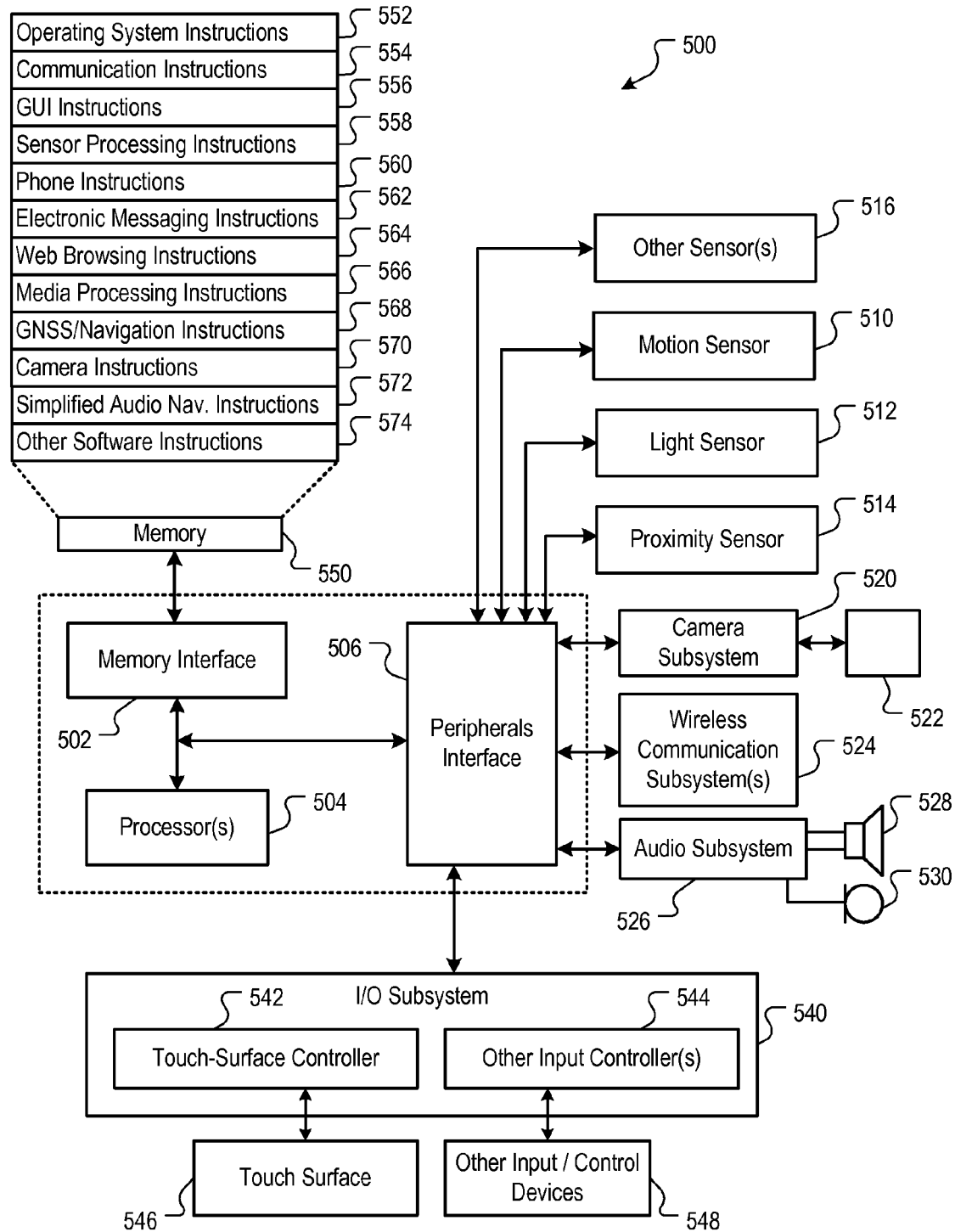
FIG. 5 is a block diagram of an example computing device that can implement the features and processes of FIGS. 1-4.

FIG. 5 is a block diagram of an example computing device 500 that can implement the features and processes of FIGS. 1-4. The computing device 500 can include a memory interface 502, one or more data processors, image processors and/or central processing units 504, and a peripherals interface 506. The memory interface 502, the one or more processors 504 and/or the peripherals interface 506 can be separate components or can be integrated in one or more integrated circuits. The various components in the computing device 500 can be coupled by one or more communication buses or signal lines.

Sensors, devices, and subsystems can be coupled to the peripherals interface 506 to facilitate multiple functionalities. For example, a motion sensor 510, a light sensor 512, and a proximity sensor 514 can be coupled to the peripherals interface 506 to facilitate orientation, lighting, and proximity functions. Other sensors 516 can also be connected to the peripherals interface 506, such as a global navigation satellite system (GNSS) (e.g., GPS receiver), a temperature sensor, a biometric sensor, magnetometer or other sensing device, to facilitate related functionalities.

A camera subsystem 520 and an optical sensor 522, e.g., a charged coupled device (CCD) or a complementary metal-oxide semiconductor (CMOS) optical sensor, can be utilized to facilitate camera functions, such as recording photographs and video clips. The camera subsystem 520 and the optical sensor 522 can be used to collect images of a user to be used during authentication of a user, e.g., by performing facial recognition analysis.

Communication functions can be facilitated through one or more wireless communication subsystems 524, which can include radio frequency receivers and transmitters and/or optical (e.g., infrared) receivers and transmitters. The specific design and implementation of the communication subsystem 524 can depend on the communication network(s) over which the computing device 500 is intended to operate. For example, the computing device 500 can include communication subsystems 524 designed to operate over a GSM network, a GPRS network, an EDGE network, a Wi-Fi or WiMax network, and a Bluetooth™ network. In particular, the wireless communication subsystems 524 can include hosting protocols such that the device 500 can be configured as a base station for other wireless devices.

An audio subsystem 526 can be coupled to a speaker 528 and a microphone 530 to facilitate voice-enabled functions, such as speaker recognition, voice replication, digital recording, and telephony functions. The audio subsystem 526 can be configured to facilitate processing voice commands, voiceprinting and voice authentication, for example.

The I/O subsystem 540 can include a touch-surface controller 542 and/or other input controller(s) 544. The touch-surface controller 542 can be coupled to a touch surface 546. The touch surface 546 and touch-surface controller 542 can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch surface 546.

The other input controller(s) 544 can be coupled to other input/control devices 548, such as one or more buttons, rocker switches, thumb-wheel, infrared port, USB port, and/or a pointer device such as a stylus. The one or more buttons (not shown) can include an up/down button for volume control of the speaker 528 and/or the microphone 530.

In one implementation, a pressing of the button for a first duration can disengage a lock of the touch surface 546; and a pressing of the button for a second duration that is longer than the first duration can turn power to the computing device 500 on or off. Pressing the button for a third duration can activate a voice control, or voice command, module that enables the user to speak commands into the microphone 530 to cause the device to execute the spoken command. The user can customize a functionality of one or more of the buttons. The touch surface 546 can, for example, also be used to implement virtual or soft buttons and/or a keyboard.

In some implementations, the computing device 500 can present recorded audio and/or video files, such as MP3, AAC, and MPEG files. In some implementations, the computing device 500 can include the functionality of an MP3 player, such as an iPod™. The computing device 500 can, therefore, include a 36-pin connector that is compatible with the iPod. Other input/output and control devices can also be used.

The memory interface 502 can be coupled to memory 550. The memory 550 can include high-speed random access memory and/or non-volatile memory, such as one or more magnetic disk storage devices, one or more optical storage devices, and/or flash memory (e.g., NAND, NOR). The memory 550 can store an operating system 552, such as Darwin, RTXC, LINUX, UNIX, OS X, WINDOWS, or an embedded operating system such as VxWorks.

The operating system 552 can include instructions for handling basic system services and for performing hardware dependent tasks. In some implementations, the operating system 552 can be a kernel (e.g., UNIX kernel). In some implementations, the operating system 552 can include instructions for performing voice authentication. For example, operating system 552 can implement the simplified audio navigation features as described with reference to FIGS. 1-4.

The memory 550 can also store communication instructions 554 to facilitate communicating with one or more additional devices, one or more computers and/or one or more servers. The memory 550 can include graphical user interface instructions 556 to facilitate graphic user interface processing; sensor processing instructions 558 to facilitate sensor-related processing and functions; phone instructions 560 to facilitate phone-related processes and functions; electronic messaging instructions 562 to facilitate electronic-messaging related processes and functions; web browsing instructions 564 to facilitate web browsing-related processes and functions; media processing instructions 566 to facilitate media processing-related processes and functions; GNSS/Navigation instructions 568 to facilitate GNSS and navigation-related processes and instructions; and/or camera instructions 570 to facilitate camera-related processes and functions.

The memory 550 can store other software instructions 572 to facilitate other processes and functions, such as the simplified audio navigation processes and functions as described with reference to FIGS. 1-4.

The memory 550 can also store other software instructions 574, such as web video instructions to facilitate web video-related processes and functions; and/or web shopping instructions to facilitate web shopping-related processes and functions. In some implementations, the media processing instructions 566 are divided into audio processing instructions and video processing instructions to facilitate audio processing-related processes and functions and video processing-related processes and functions, respectively.

Each of the above identified instructions and applications can correspond to a set of instructions for performing one or more functions described above. These instructions need not be implemented as separate software programs, procedures, or modules. The memory 550 can include additional instructions or fewer instructions. Furthermore, various functions of the computing device 500 can be implemented in hardware and/or in software, including in one or more signal processing and/or application specific integrated circuits.

What is claimed is:

1. A method comprising:
  receiving, at a mobile device, a user selection of a control setting associated with presenting, for routes determined by the mobile device, audio navigation instructions for portions of the routes;
  obtaining a route between a starting location and a destination location;
  determining that the mobile device is configured, based on the user selection of the control setting, to present audio navigation instructions for a first portion of the route;
  determining that the mobile device is configured, based on the user selection of the control setting, not to present audio navigation instructions for a second portion of the route, wherein the second portion of the route is determined based on a user-specified distance from the destination location;
  determining a location of the mobile device along the route; and
  presenting, by the mobile device, audio navigation instructions when the location of the mobile device corresponds to the first portion of the route.

2. The method of claim 1, wherein the first portion of the route and the second portion of the route are determined based on a user-specified radius around the starting location or the destination location.

3. The method of claim 1, wherein the first portion of the route is determined based on a user-specified distance from the starting location or the destination location.

4. The method of claim 1, wherein the first portion of the route and the second portion of the route are determined based on a user-specified road type.

5. The method of claim 1, wherein the first portion of the route and the second portion of the route are determined based on an automatically determined complexity of the first portion of the route and the second portion of the route.

6. The method of claim 5, wherein the complexity of the first portion of the route or the second portion of the route is computed based on a number of turns per unit of distance along the route.

7. The method of claim 6, wherein computing the complexity of the first portion of the route or the second portion of the route comprises:
  computing a number of turns per unit of distance along a portion of the route;
  comparing the computed number of turns to a threshold value; and
  identifying the portion of the route as one of the first portion or the second portion based on the comparison.

8. The method of claim 5, wherein the complexity of the first portion of the route or the second portion of the route is determined based on historical navigation errors.

9. The method of claim 8, wherein the historical navigation errors are determined from historical navigation data collected from a plurality of mobile devices.

10. The method of claim 8, wherein determining the complexity of the first portion of the route or the second portion of the route comprises:
  obtaining, by the mobile device, historical data associated with route portions where navigation errors have been committed in the past; and
  identifying, based on the historical data, a route portion where navigation errors have been committed in the past as a first portion of the route for which the mobile device is configured to present audio navigation instructions.

11. The method of claim 1, further comprising:
preventing, by the mobile device, presentation of audio navigation instructions when the location of the mobile device corresponds to the second portion of the route.

12. The method of claim 11, further comprising:
determining that the mobile device has deviated from the route while traversing the second portion of the route; and
in response to determining the deviation, presenting, by the mobile device, audio navigation instructions when the mobile device deviates from the route while traversing the second portion of the route, where the mobile device is configured not to present audio navigation instructions when the mobile device is traversing the second portion of the route.

13. The method of claim 1, further comprising:
displaying, by the mobile device, a map indicating the route between the starting location and the destination location;
presenting a turn-by-turn display of the route when the mobile device is located on the first portion of the route; and
presenting an overview display of the route when the mobile device is located on the second portion of the route.

14. The method of claim 13, wherein presenting the turn-by-turn display comprises providing a zoomed in presentation of the route that presents a close up view of a single turn, and wherein presenting the overview display comprises providing the entire route.

15. The method of claim 1, wherein receiving the user selection the control setting comprises:
receiving user selection of one or more settings options specifying criteria for determining the portions of the routes for which audio navigation instructions are to be presented.

16. A system comprising:
one or more processors; and
a computer-readable medium including one or more sequences of instructions which, when executed by the one or more processors, are configured to cause the one or more processors to perform operations comprising:
receiving, at a mobile device, a user selection of a control setting associated with presenting, for routes determined by the mobile device, audio navigation instructions for portions of the routes;
obtaining a route between a starting location and a destination location;
determining that the mobile device is configured, based on the user selection of the control setting, to present audio navigation instructions for a first portion of the route;
determining that the mobile device is configured, based on the user selection of the control setting, not to present audio navigation instructions for a second portion of the route, wherein the second portion of the route is determined based on a user-specified distance from the destination location;
determining a location of the mobile device along the route; and
presenting, by the mobile device, audio navigation instructions when the location of the mobile device corresponds to the first portion of the route.

17. The system of claim 16, wherein the first portion of the route and the second portion of the route are determined based on a user-specified radius around the starting location or the destination location.

18. The system of claim 16, wherein the first portion of the route is determined based on a user-specified distance from the starting location or the destination location.

19. The system of claim 16, wherein the first portion of the route and the second portion of the route are determined based on a user-specified road type.

20. The system of claim 16, wherein the first portion of the route and the second portion of the route are determined based on an automatically determined complexity of the first portion of the route and the second portion of the route.

21. The system of claim 20, wherein the complexity of the first portion of the route or the second portion of the route is computed based on a number of turns per unit of distance along the route.

22. The system of claim 20, wherein the complexity of the first portion of the route or the second portion of the route is determined based on historical navigation errors.

23. The system of claim 22, wherein the historical navigation errors are determined from historical navigation data collected from a plurality of mobile devices.

24. The system of claim 16, wherein the instructions cause the one or more processors to perform operations comprising:
preventing, by the mobile device, presentation of audio navigation instructions when the location of the mobile device corresponds to the second portion of the route.

25. The system of claim 24, wherein the instructions cause the one or more processors to perform operations comprising:
determining that the mobile device has deviated from the route while traversing the second portion of the route; and
in response to determining the deviation, presenting, by the mobile device, audio navigation instructions when the mobile device deviates from the route while traversing the second portion of the route, where the mobile device is configured not to present audio navigation instructions when the mobile device is traversing the second portion of the route.

26. The system of claim 16, wherein the instructions cause the one or more processors to perform operations comprising:
displaying, by the mobile device, a map indicating the route between the starting location and the destination location;
presenting a turn-by-turn display of the route when the mobile device is located on the first portion of the route; and
presenting an overview display of the route when the mobile device is located on the second portion of the route.

* * * * *